(12) United States Patent
Wang

(10) Patent No.: US 12,736,473 B2
(45) Date of Patent: Sep. 15, 2026

(54) COLOR DIFFRACTION TEST DEVICE AND TEST METHOD THEREOF, AND COLOR DIFFRACTION TEST SYSTEM

(71) Applicant: BOE Technology Group Co., Ltd., Beijing (CN)

(72) Inventor: Bo Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 155 days.

(21) Appl. No.: 18/688,045

(22) PCT Filed: Sep. 21, 2022

(86) PCT No.: PCT/CN2022/120225
§ 371 (c)(1),
(2) Date: Feb. 29, 2024

(87) PCT Pub. No.: WO2023/061170
PCT Pub. Date: Apr. 20, 2023

(65) Prior Publication Data

US 2025/0123203 A1 Apr. 17, 2025

(30) Foreign Application Priority Data

Oct. 12, 2021 (CN) .......................... 202111187386.8

(51) Int. Cl.
*G01N 21/47* (2006.01)

(52) U.S. Cl.
CPC ... *G01N 21/4788* (2013.01); *G01N 2201/021* (2013.01)

(58) Field of Classification Search
CPC ......... G01N 21/4788; G01N 2201/021; G01N 21/25; G01N 21/01; G01M 11/04
(Continued)

(56) References Cited

U.S. PATENT DOCUMENTS 6,317,209 B1 11/2001 Priestley
6,597,454 B1 * 7/2003 Berg ......................... G01J 3/51 356/402
(Continued)

FOREIGN PATENT DOCUMENTS

CN 205642801 U 10/2016
CN 109739034 A 5/2019
(Continued)

OTHER PUBLICATIONS

PCT/CN2022/120225 international search report dated Dec. 27, 2022.

*Primary Examiner* — Isiaka O Akanbi
(74) *Attorney, Agent, or Firm* — IPro, PLLC

(57) ABSTRACT

A color diffraction test device and a test method thereof, and a color diffraction test system are disclosed. The color diffraction test device includes: an objective table configured to drive, during a test, a sample to be tested to rotate in a plane where the objective table is located, where a rotation axis of the objective table is a perpendicular bisector of the objective table, and a test point of the sample to be tested is on the perpendicular bisector of the objective table; a light source configured to irradiate the sample to be tested, where an orthographic projection of a light spot center of the light source on the objective table coincides with a center of the objective table; and a measurement instrument located on a same side of the objective table as the light source.

19 Claims, 3 Drawing Sheets

(58) Field of Classification Search
USPC .................. 356/445, 446, 300, 237.2–237.6
See application file for complete search history.

(56) References Cited

U.S. PATENT DOCUMENTS

| | | | | |
|---|---|---|---|---|
| 7,180,585 B2 * | 2/2007 | Kreh | G01N 21/8806 | 356/237.4 |
| 7,391,518 B1 * | 6/2008 | Schwarz | G01B 11/30 | 356/600 |
| 7,679,747 B2 * | 3/2010 | Kuwada | G01N 21/57 | 356/445 |
| 9,772,230 B2 * | 9/2017 | Ehbets | G01J 3/50 | |
| 2006/0033058 A1 * | 2/2006 | Schwarz | G01J 3/504 | 250/559.39 |
| 2007/0109542 A1 * | 5/2007 | Tracy | G01N 21/553 | 356/445 |
| 2014/0176938 A1 * | 6/2014 | Yang | G01B 11/26 | 356/138 |
| 2016/0334326 A1 * | 11/2016 | Sapiens | G03F 7/70625 | |

FOREIGN PATENT DOCUMENTS

| | | | | |
|---|---|---|---|---|
| CN | 208969374 U | * | 6/2019 | G02F 1/13 |
| CN | 210072251 U | * | 2/2020 | G02F 1/13 |
| CN | 111077149 A | | 4/2020 | |
| CN | 217033570 U | | 7/2022 | |
| JP | H08210975 A | | 8/1996 | |

* cited by examiner

COLOR DIFFRACTION TEST DEVICE AND TEST METHOD THEREOF, AND COLOR DIFFRACTION TEST SYSTEM

CROSS-REFERENCE TO RELATED APPLICATION

This application is a National Stage of International Application No. PCT/CN2022/120225, filed on Sep. 21, 2022, which claims priority to Chinese Patent Application No. 202111187386.8, filed with the China National Intellectual Property Administration on Oct. 12, 2021, and entitled "Color Diffraction Test Device and Test Method Thereof, and Color Diffraction Test System", the content of which is hereby incorporated by reference in its entirety.

TECHNICAL FIELD

The present disclosure relates to the field of display technology, and in particular to a color diffraction test device, a test method thereof, and a color diffraction test system.

BACKGROUND

With the advancement of technology, various display devices have been widely developed and applied. For example, organic light-emitting display devices (OLEDs) have been widely used in virtual reality displays, wearable devices, smart phones, tablet computers, displays, vehicle-mounted devices, televisions and other fields, due to functions of ultra-thin, light weight, flexibility, bright colors, low power consumption, and short response time of the OLEDs. The flexibility of the OLED broadens the application range of the OLED. However, the bending ability of the OLED is poor, and the bendable radius the OLED is relatively large, so the OLED can only be used in Edge mobile phones, armbands, wristbands, bracelets and other products. With the development of technology, the bendable radius has decreased, and the OLED has gradually begun to be used in full-screen mobile phones and watches. Recently, some manufacturers have gradually launched prototypes of folding screens.

SUMMARY

Embodiments of the present disclosure provide a color diffraction test device, a test method thereof and a color diffraction test system, and specific schemes are as follows.

In an aspect, some embodiments of the present disclosure provide a color diffraction test device, including:

- an objective table configured to drive a to-be-tested sample to rotate in a plane where the objective table is located during a test process, where a rotation axis of the objective table is a perpendicular bisector of the objective table, a test point of the to-be-tested sample is on the perpendicular bisector of the objective table;
- a light source configured to irradiate the to-be-tested sample, where an orthographic projection of a light spot center of the light source on the objective table roughly coincides with a center of the objective table;
- a measurement instrument, where the measurement instrument and the light source are located on a same side of the objective table, an orthographic projection of a measurement center of the measurement instrument on the objective table roughly coincides with the center of the objective table, and an orthographic projection of the measurement instrument on the objective table does not overlap with an orthographic projection of the light source on the objective table; the measurement instrument is configured to test a color diffraction phenomenon of the to-be-tested sample irradiated by the light source.

In some embodiments, the color diffraction test device of the present disclosure, further includes: a first variable-angle guide rail on which the measurement instrument is disposed;

- the measurement instrument moves on the first variable-angle guide rail to change a measurement angle of the measurement instrument, and the measurement angle is an angle between a connection line of a center of the measurement instrument and a center of the to-be-tested sample and the perpendicular bisector of the objective table, an orthographic projection of the center of the to-be-tested sample on the objective table roughly coincides with the center of the objective table.

In some embodiments, the color diffraction test device of the present disclosure, further includes: a second variable-angle guide rail on which the light source is disposed;

- the light source moves on the second variable-angle guide rail to change an incident angle at which light of the light source irradiates the to-be-tested sample, and the incident angle is an angle between a connection line of a center of the light source and the center of the to-be-tested sample, and the perpendicular bisector of the objective table.

In some embodiments, in the color diffraction test device of the present disclosure, the first variable-angle guide rail and the second variable-angle guide rail are disposed symmetrically with respect to the perpendicular bisector of the objective table.

In some embodiments, in the color diffraction test device of the present disclosure, a shape of the first variable-angle guide rail and a shape of the second variable-angle guide rail are both an arc, and an orthographic projection of a center of a circle where the arc is located on the objective table roughly coincides with the center of the objective table.

In some embodiments, in the color diffraction test device of the present disclosure, an angle between a tangent line of the arc and the perpendicular bisector of the objective table is in a range of 0° to 80°.

In some embodiments, the color diffraction test device of the present disclosure, further includes: an airtight light-shielding box, inner surfaces of the airtight light-shielding box include an upper surface and a lower surface opposite to each other, and a first side surface and a second side surface opposite to each other and connecting the upper surface and the lower surface; where,

- the objective table is disposed on the lower surface, the first variable-angle guide rail is disposed on the first side surface, and the second variable-angle guide rail is disposed on the second side surface.

In some embodiments, the color diffraction test device of the present disclosure, further includes: a vertical guide rail, the vertical guide rail is on the perpendicular bisector of the objective table, and the light source is disposed on the vertical guide rail;

- the light source moves on the vertical guide rail to change a distance from the light source to the to-be-tested sample.

In some embodiments, the color diffraction test device of the present disclosure, further includes: an airtight light-shielding box, inner surfaces of the airtight light-shielding box include an upper surface and a lower surface opposite to each other, and a side surface connecting the upper surface and the lower surface; where, the objective table is disposed on the lower surface, the vertical guide rail is disposed on the upper surface, and the first variable-angle guide rail is disposed on the side surface.

In some embodiments, in the color diffraction test device of the present disclosure, a ratio of a distance between the center of the light source and the center of the to-be-tested sample to an effective diameter of the light source is greater than or equal to any one of 5 to 10.

In some embodiments, in the color diffraction test device of the present disclosure, the distance between the center of the light source and the center of the to-be-tested sample is in a range of 10 cm to 100 cm.

In some embodiments, the color diffraction test device of the present disclosure, further includes: a diaphragm, the diaphragm is fixed on a light-emitting surface of the light source, and a diameter of the diaphragm is adjustable.

In some embodiments, in the color diffraction test device of the present disclosure, the diameter of the diaphragm is in a range of 1 mm to 5 mm.

In some embodiments, in the color diffraction test device of the present disclosure, the light source is a white light source.

In some embodiments, in the color diffraction test device of the present disclosure, a distance between the center of the measurement instrument and the center of the to-be-tested sample is in a range of 20 cm to 60 cm.

In some embodiments, in the color diffraction test device of the present disclosure, measurement field angles of the measurement instrument include 0.1°, 0.2° and 1°.

In another aspect, embodiments of the present disclosure provide a color diffraction test system, including the color diffraction test device according to any one of above embodiments.

In another aspect, embodiments of the present disclosure provide a test method for the color diffraction test device according to any one of above embodiments, including:

using the light source to irradiate the to-be-tested sample on the objective table, and adjusting a relative position between the light spot center of the light source and the center of the objective table until the light spot center of the light source roughly coincides with the center of the objective table;

setting up a measurement angle of the measurement instrument, and adjusting a relative position between the measurement center of the measurement instrument and the center of the objective table at the measurement angle set for a first time until the measurement center of the measurement instrument roughly coincides with the center of the objective table;

where at each measurement angle, the objective table rotates a single revolution around the perpendicular bisector of the objective table in the plane where the objective table is located, and during a rotation process, testing brightness L* and color coordinates a* and b* of the test point of the to-be-tested sample by the measurement instrument once the objective table rotates a preset angle; the test point of the to-be-tested sample is on the perpendicular bisector of the objective table;

using a following formula to characterize a strength of the color diffraction phenomenon at each measurement angle:

$$\Delta l_{ab}*=\sqrt{(\Delta a*)^2+(\Delta b*)^2};$$

$$\Delta E_{ab}*=\sqrt{(\Delta L*)^2+(\Delta a*)^2+(\Delta b*)^2};$$

where the smaller $\Delta l_{ab}$* is, the whiter a light color of the color diffraction phenomenon is, the smaller $\Delta E_{ab}$* is, the weaker light brightness of the color diffraction phenomenon is, and Δa* is a difference between a* and a reference color coordinate 0, Δb* is a difference between b* and the reference color coordinate 0, and ΔL* is a difference between the L* and reference brightness 0.

In some embodiments, in the test method of the present disclosure, the light source irradiates the to-be-tested sample vertically, and the measurement instrument is on one side of the perpendicular bisector of the objective table;

during the rotation process, testing the brightness L* and the color coordinates a* and b* of the test point of the to-be-tested sample by the measurement instrument once the objective table rotates the preset angle, includes:

during the rotation process, testing the brightness L* and the color coordinates a* and b* of the center of the to-be-tested sample by the measurement instrument at every interval of a rotation angle not greater than 2°.

In some embodiments, in the test method of the present disclosure, the light source and the measurement instrument are disposed symmetrically with respect to the perpendicular bisector of the objective table;

during the rotation process, testing the brightness L* and the color coordinates a* and b* of the test point of the to-be-tested sample by the measurement instrument once the objective table rotates the preset angle, includes:

during the rotation process, testing the brightness L* and the color coordinates a* and b* of the center of the to-be-tested sample by the measurement instrument at every interval of a rotation angle not greater than 45°.

DETAILED DESCRIPTION

Figure 1:
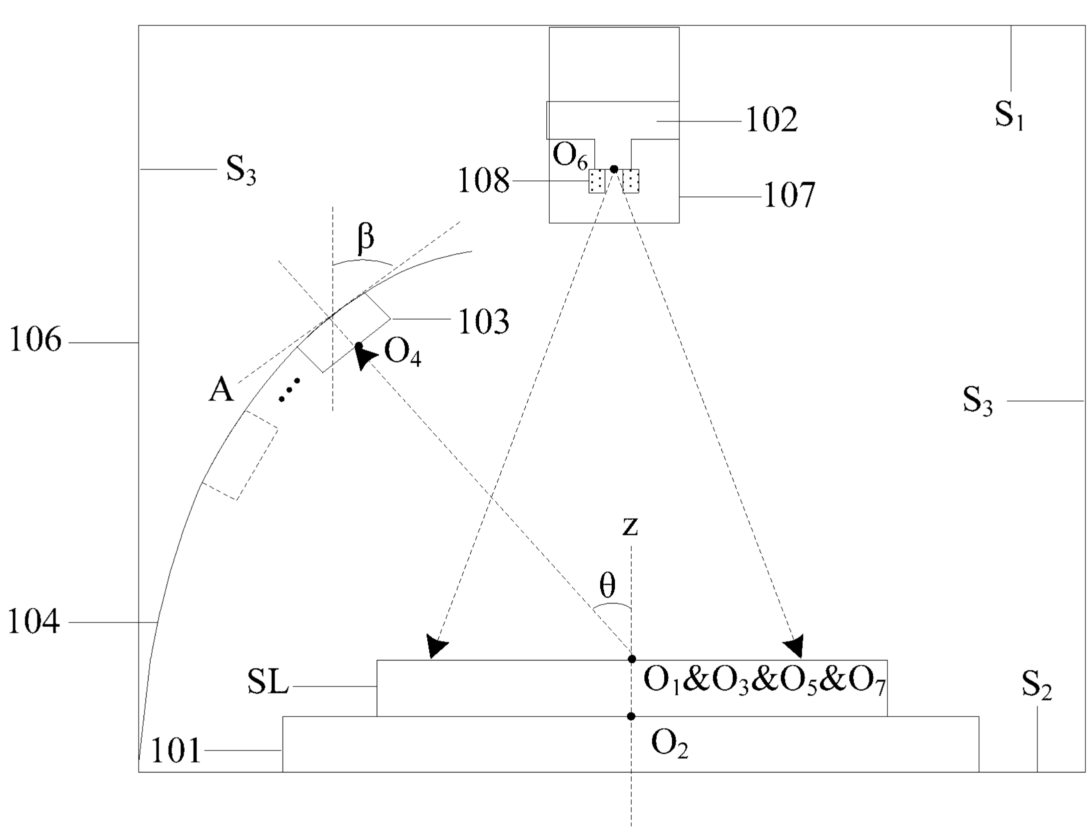
FIG. 1 is a schematic structural diagram of a color diffraction test device according to an embodiment of the present disclosure.

In order to make the purpose, technical solutions and advantages of embodiments of the present disclosure clearer, the technical solutions of embodiments of the present disclosure will be clearly and completely described below in conjunction with the accompanying drawings of embodiments of the present disclosure. It should be noted that the size and shape of each figure in the drawings do not reflect the true scale, but are only intended to illustrate the present disclosure. The same or similar reference numerals represent the same or similar elements or elements having the same or similar functions throughout.

Unless otherwise defined, technical terms or scientific terms used herein should have the usual meanings understood by those of ordinary skill in the art to which this disclosure belongs. “First”, “second” and similar words used in the present disclosure and claims do not indicate any order, quantity or importance, but are only used to distinguish different components. “Comprising” or “including” and similar words mean that the elements or items appearing before the word include the elements or items listed after the word and their equivalents, without excluding other elements or items. “Inner”, “outer”, “upper”, “lower” and so on are only used to indicate relative positional relationship. When the absolute position of the described object changes, the relative positional relationship may also change accordingly.

In the related art, the flexible OLED uses a circular polarizer as an anti-reflection functional film layer, and a main function of the circular polarizer is to reduce reflection of external light by metals in the OLED structure to improve a contrast in a bright environment. Because the circular polarizer is prone to breakage and creases when being bent, it is necessary to develop technologies to replace the existing circular polarizer. Therefore, the technology of mounting a color filter CF on an encapsulation layer TFE (CF on Encapsulation, COE) was born. However, the color filter CF in the COE technology includes a grid-like black matrix BM and color-resistors R/G/B that fill the grid, so more array structures are introduced. Therefore, when the screen is off, a color separation phenomenon (i.e., a color diffraction phenomenon) occurs near a projection point of an external light source.

At present, all major panel manufacturers are making efforts in COE technology, and customers are more concerned about the color diffraction phenomenon. In addition, the liquid crystal display device (LCD) also has an array structure introduced by the color filter CF, so the color diffraction phenomenon may also occur under irradiation of an external light source. The color diffraction may also occur when the display device includes other microstructures (such as a touch metal grid). Therefore, an objective evaluation for the color diffraction phenomenon is very important.

For the test of the color diffraction phenomenon, it is required to ensure that a center of a light spot formed by an external light source on an objective table, a center of the objective table and a measurement center of a measurement instrument coincide during a rotation process, that is, it is necessary to ensure that test points of samples to be tested on the objective table are at the same position. However, a traditional optical test device does not integrate an external light source. After the traditional optical test device is used in combination with an external light source, the above three points do not coincide. As a result, when the objective table rotates during the test process, the test point may be shifted, and it is impossible to test the color diffraction phenomenon.

Figure 2:
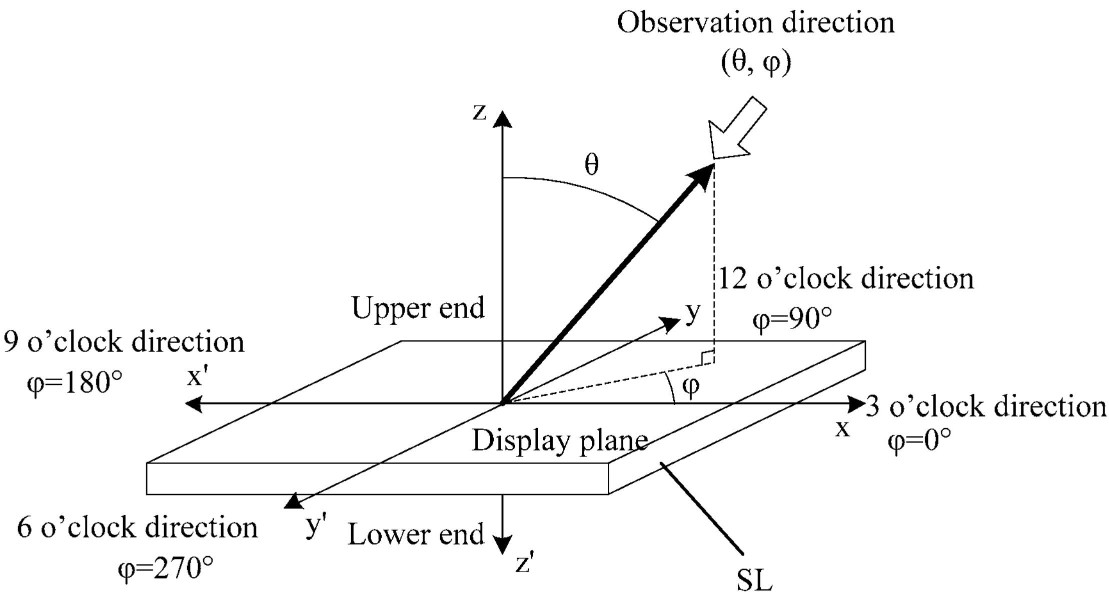
FIG. 2 is a schematic diagram of an observation angle for a color diffraction phenomenon.

In order to at least solve the above technical problems existing in the related art, an embodiment of the present disclosure provides a color diffraction test device, as shown in FIG. 1 and FIG. 2, which may include following components.

An objective table 101 is included. The objective table 101 is configured to drive a to-be-tested sample SL to rotate in a plane (such as a plane xy) where the objective table 101 is located during a test process (for example, a measurement angle θ is fixed, and the objective table 101 rotates from an angle φ equal to 0° to an angle @ equal to) 360°, where a rotation axis (such as a z-axis) of the objective table 101 is a perpendicular bisector of the objective table 101 (that is, a straight line passing through a center $O_2$ of the objective table 101 and perpendicular to the objective table 101), a test point of the to-be-tested sample SL is on the perpendicular bisector of the objective table 101. Optionally, the to-be-tested sample SL may include a color filter CF or other microstructures, and the to-be-tested sample SL may be an OLED display product or a LCD display product in the off-screen state. In some embodiments, the objective table 101 can have an adsorption force, so that the to-be-tested sample SL can be adsorbed on the objective table 101. Of course, the objective table 101 can also fix the to-be-tested sample SL by clamping, etc., which is not limited here.

A light source 102 is included. The light source 102 is configured to irradiate the to-be-tested sample SL, and an orthographic projection of a light spot center $O_1$ of the light source 102 on the objective table 101 roughly coincides with a center $O_2$ of the objective table 101.

A measurement instrument (LMD) 103 is included. The measurement instrument 103 and the light source 102 are located on a same side of the objective table 101, an orthographic projection of a measurement center $O_3$ of the measurement instrument 103 on the objective table 101 roughly coincides with the center $O_2$ of the objective table 101, and an orthographic projection of the measurement instrument 103 on the objective table 101 does not overlap with an orthographic projection of the light source 102 on the objective table 101, so that the measurement instrument 103 does not shield the light source 102 from irradiating the to-be-tested sample SL on the objective table 101, and the light source 102 does not shield the measurement instrument 103 from detecting a color diffraction phenomenon of the to-be-tested sample SL. The measurement instrument 103 is configured to test the color diffraction phenomenon of the to-be-tested sample SL irradiated by the light source 102. Optionally, the measurement instrument 103 may include a spectrophotometer, an imaging brightness meter, and the like. In some embodiments, in order to avoid the interference from external light, the test of the color diffraction phenomenon can be performed in a dark space. The dark space means that bright light exists in the space only when the light source 102 is turned on, and there is no other disturbing light.

In the above color diffraction test device according to embodiments of the present disclosure, because the orthographic projection of the light spot center $O_1$ of the light source 102 on the objective table 101, the orthographic projection of the measurement center $O_3$ of the measurement instrument 103 on the objective table 101, and the center $O_2$ of the objective table 101 roughly coincide, during the rotation of the objective table 101 around the perpendicular bisector (such as the z-axis) in the plane (such as the plane xy) where the objective table 101 is located, the above three centers $O_1$, $O_2$ and $O_3$ can always coincide together, and a relative position between the to-be-tested sample SL and the objective table 101 remains unchanged, during the rotation of the objective table 101, the test point of the to-be-tested sample SL is at the same point on the perpendicular bisector, and may not be shifted, so that the test of the color diffraction phenomenon can be realized.

In some embodiments, the orthographic projection of the light spot center $O_1$ of the light source 102 on the objective table 101, the orthographic projection of the measurement center $O_3$ of the measurement instrument 103 on the objective table 101, and the center $O_2$ of the objective table 101 can be controlled to roughly coincide by a computer or the like, to realize the automatic alignment of the three points (the orthographic projection of the light spot center $O_1$, the orthographic projection of the measurement center $O_3$, and the center $O_2$). In addition, if the traditional optical test device is used in combination with an external light source 102, a test layout of the external light source 102 needs to be manually set, resulting in poor repeatability and inability to ensure the accuracy and consistency of the test of the color diffraction. The device of the present disclosure integrates an external light source 102, and a distance of the light source 102 and an incident angle of the light source 102 can be precisely set, ensuring the accuracy and consistency of the test of the color diffraction, and improving the test efficiency and repeatability.

It should be noted that due to the limitation of process conditions or the influence of other factors such as measurement, the "roughly coincide" mentioned in the present disclosure may coincide exactly, or there may be some deviations, so a relationship of "roughly coincide" between related features fall within the protection scope of the present disclosure as long as the tolerance of error is satisfied.

Figure 3:
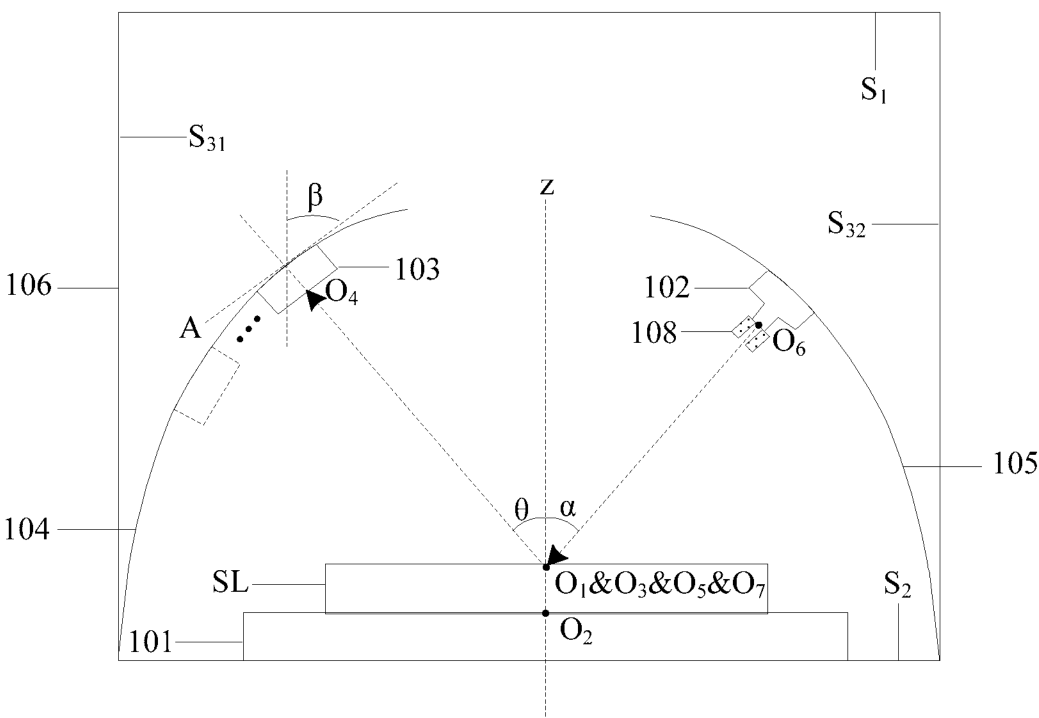
FIG. 3 is another schematic structural diagram of a color diffraction test device according to an embodiment of the present disclosure.

In some embodiments, as shown in FIG. 1 and FIG. 3, the above color diffraction test device according to embodiments of the present disclosure may further include: a first variable-angle guide rail 104 on which the measurement instrument 103 is disposed. The measurement instrument 103 moves on the first variable-angle guide rail 104 to change a measurement angle θ of the measurement instrument 103. The measurement angle θ is an angle between a connection line $O_4O_5$ of a center $O_4$ of the measurement instrument 103 and a center $O_5$ of the to-be-tested sample SL, and the perpendicular bisector (equivalent to the z-axis) of the objective table 101. An orthographic projection of the center $O_5$ of the to-be-tested sample SL on the objective table 101 roughly coincides with the center $O_2$ of the objective table 101.

The first variable-angle guide rail 104 cooperates with the measurement instrument 103 to change the measurement angle θ, to realize the test of the color diffraction phenomenon of the to-be-tested sample SL under multiple measurement angles θ, so that the color diffraction phenomenon of the to-be-tested sample SL can be characterized more comprehensively and more accurately. In the present disclosure, the color diffraction phenomenon at the center $O_5$ of the to-be-tested sample SL is taken as an example for illustration. An orthographic projection of another position except the center $O_5$ of the to-be-tested sample SL can also coincides with the center $O_2$ of the objective table 101, to test the color diffraction phenomenon of the other position except the center $O_5$ of the to-be-tested sample SL.

In some embodiments, as shown in FIG. 3, the above color diffraction test device according to embodiments of the present disclosure may further include: a second variable-angle guide rail 105 on which the light source 102 is disposed. The light source 102 moves on the second variable-angle guide rail 105 to change an incident angle α at which light of the light source 102 irradiates the to-be-tested sample SL, and the incident angle α is an angle between a connection line $O_5O_6$ of a center $O_6$ of the light source 102 and the center $O_5$ of the to-be-tested sample SL and the perpendicular bisector (equivalent to the z-axis) of the objective table 101.

The incident angle α of the light source 102 has a great influence on a test result of the color diffraction phenomenon on the to-be-tested sample SL. Therefore, in the present disclosure, the second variable-angle guide rail 105 is used to cooperate with the light source 102 to change the incident angle α, to achieve the test of the color diffraction phenomenon of the to-be-tested sample SL under multiple incident angles α, so that the color diffraction phenomenon of the to-be-tested sample SL can be characterized more comprehensively and more accurately.

In some embodiments, in the above color diffraction test device according to embodiments of the present disclosure, as shown in FIG. 3, the first variable-angle guide rail 104 and the second variable-angle guide rail 105 can be disposed symmetrically with respect to the perpendicular bisector (equivalent to the z-axis) of the objective table 101, to facilitate to adjust the measurement instrument 103 on the first variable-angle guide rail 104 and the light source 102 on the second variable-angle guide rail to be disposed symmetrically with respect to the perpendicular bisector (equivalent to the z-axis) of the objective table 101 so that the incident angle α equals to the measurement angle θ. Of course, in some embodiments, the measurement instrument 103 on the first variable-angle guide rail 104 and the light source 102 on the second variable-angle guide rail 105 may not be disposed symmetrically with respect to the perpendicular bisector (equivalent to the z-axis) of the objective table 101, so that the incident angle α is different from the measurement angle θ. The above settings make it possible to form a variety of combinations between the incident angle α and the measurement angle θ, so that the color diffraction phenomenon of the to-be-tested sample SL can be tested under different combinations of the incident angle α and the measurement angle θ, which enriches the test data, and the color diffraction phenomenon of the to-be-tested sample SL is more accurately characterized.

In some embodiments, in the above color diffraction test device according to embodiments of the present disclosure, as shown in FIGS. 1 and 3, a shape of the first variable-angle guide rail 104 and a shape of the second variable-angle guide rail 105 are both an arc, and an orthographic projection of a center $O_7$ of a circle where the arc is located on the objective table 101 roughly coincides with the center $O_2$ of the objective table 101. This arrangement can ensure that when the measurement instrument 103 moves back and forth on the first variable-angle guide rail 104 and the light source 102 moves back and forth on the second variable-angle guide rail 105, the measurement center $O_3$ of the measurement instrument 103 on the objective table 101 and the orthographic projection of the light spot center $O_1$ of the light source 102 on the objective table 101 roughly coincide with the center of the objective table 101.

In some embodiments, in the above color diffraction test device according to embodiments of the present disclosure, as shown in FIG. 1 and FIG. 3, an angle β between a tangent line A of the arc and the perpendicular bisector of the objective table 101 (equivalent to the z-axis) can be in a range of 0° to 80°, and it can be seen from FIG. 1 and FIG. 3 that the measurement angle θ and the angle β are complementary, thus the measurement angle θ is in a range of 10° to 90°, such as 10°, 45°, 60°, 90°, etc. The measurement angle θ in the range of 10° to 90° can almost include observation directions of the to-be-tested sample SL by a user during actual use of the to-be-tested sample SL, so that color diffraction phenomena observed by the user in the actual use process can be more accurately reflected by quantified data. In addition, as shown in FIG. 3, the incident angle α is symmetrically equal to the measurement angle θ, that is, the incident angle α is also complementary to the angle β. Therefore, the incident angle α can also be in a range of 10° to 90°, for example, 10°, 45°, 60°, 90°, etc. The incident angle $\alpha$ in the range of 10° to 90° can almost include incident directions of external ambient light on the sample SL when the user is actually using the to-be-tested sample SL, so that the color diffraction phenomena observed by the user in the actual use process can be more accurately reflected by the quantified data.

In some embodiments, as shown in FIG. 3, the color diffraction test device according to embodiments of the present disclosure may further include: an airtight light-shielding box 106, where inner surfaces of the airtight light-shielding box 106 include an upper surface $S_1$ and a lower surface $S_2$ opposite to each other, and a first side surface $S_{31}$ and a second side surface $S_{32}$ opposite to each other and connecting the upper surface $S_1$ and the lower surface $S_2$. Here, the objective table 101 is disposed on the lower surface $S_2$, the first variable-angle guide rail 104 is disposed on the first side surface $S_{31}$, and the second variable-angle guide rail 105 is disposed on the second side surface $S_{32}$. The objective table 101, the first variable-angle guide rail 104 (on which the measurement instrument 103 is disposed), and the second variable-angle guide rail 105 (on which the light source 102 is disposed) are jointly disposed inside the airtight light-shielding box 106, so that the color diffraction test device is easy to carry, and the airtight light-shielding box 106 provides a dark test environment, so that it is not necessary to test in a dark room, which is convenient for operators to perform test operations.

In some embodiments, as shown in FIG. 1, the above color diffraction test device according to embodiments of the present disclosure may further include a vertical guide rail 107 disposed on the perpendicular bisector (equivalent to the z-axis) of the objective table 101. The light source 102 is disposed on the vertical guide rail 107 and moves on the vertical guide rail 107 to change a distance from the light source 102 to the to-be-tested sample SL. The distance from the light source 102 to the to-be-tested sample SL has a great influence on the test result of the color diffraction phenomenon on the to-be-tested sample SL. Therefore, in the present disclosure, the vertical guide rail 107 is used to cooperate with the light source 102 to change the distance from the light source 102 to the to-be-tested sample SL. The color diffraction phenomenon of the to-be-tested sample SL is tested at different distances, so that the color diffraction phenomenon of the to-be-tested sample SL can be characterized more comprehensively and accurately.

In some embodiments, in the above color diffraction test device according to embodiments of the present disclosure, in order to better characterize the color diffraction phenomenon, a ratio of a distance between the center $O_6$ of the light source 102 and the center $O_5$ of the to-be-tested sample SL to an effective diameter (light emitted by the light source 102 within a range of the effective diameter can be irradiated onto the to-be-tested sample SL) of the light source 102 can be greater than or equal to any one of 5 to 10. Optionally, the distance between the center $O_6$ of the light source 102 and the center $O_5$ of the to-be-tested sample SL may be in a range of 10 cm to 100 cm, for example, 40 cm.

In some embodiments, as shown in FIG. 1 and FIG. 3, the above color diffraction test device according to embodiments of the present disclosure may further include a diaphragm 108 fixed on a light-emitting surface of the light source 102. A diameter of the diaphragm 108 is adjustable, so that the effective diameter of the light source 102 can be regulated by adjusting the diameter of the diaphragm 108. Optionally, the diameter of the diaphragm 108 may be in a range of 1 mm to 5 mm, and correspondingly, the effective diameter of the light source 102 may be in a range of 1 mm to 5 mm, for example, 2 mm.

In some embodiments, in the above color diffraction test device according to embodiments of the present disclosure, in order to better reflect the color diffraction phenomenon observed by the user, the light source 102 should be a white light source that includes the entire spectrum of visible light. For example, the light source can be a CIE A light source or D65 light source. In specific implementation, the CIE A light source with standard spectrum can be chosen. In some embodiments, in order to simulate actual light source conditions, a point light source or a collimated light source can be selected. Optionally, an intensity of the light source 102 is adjustable to ensure that an illuminance range on the to-be-tested sample SL is in a range of 100 lx to 500 lx, such as 300 lx, to simulate the color diffraction phenomenon caused by the external ambient light (such as lamplight or sunlight) under different brightness during the actual use of the user.

In some embodiments, in the above color diffraction test device according to embodiments of the present disclosure, a distance between the center $O_4$ of the measurement instrument 103 and the center $O_5$ of the to-be-tested sample SL may be in a range of 20 cm to 60 cm, for example, 50 cm. Because in the process of using the to-be-tested sample SL, the distance from the user's eye to the to-be-tested sample SL is about 20 cm to 60 cm, within the distance range of 20 cm to 60 cm, the color diffraction phenomenon detected by the measurement instrument 103 can be similar to the color diffraction phenomenon observed by the user in the process of using the to-be-tested sample SL, which is equivalent to objectively quantifying the intuitive perception of the human eye on the color diffraction phenomenon.

In some embodiments, in the above color diffraction test device according to embodiments of the present disclosure, in order to more finely reflect the color diffraction phenomenon, measurement field angles (i.e., lighting range) of the measurement instrument 103 may include 0.1°, 0.2° and 1°. The measurement instrument 103 can have three measurement field angles of 0.1°, 0.2° and 1°, and one of the three measurement field angles can be selected during the actual test process. For example, in some embodiments, a measurement field angle of 0.2° may be selected for testing.

In some embodiments, in a case where the above color diffraction test device according to embodiments of the present disclosure includes a vertical guide rail 107, as shown in FIG. 1, the objective table 101 can be disposed on the lower surface $S_2$ of the airtight light-shielding box 106, the vertical guide rail 107 can be disposed on the upper surface $S_1$ of the airtight light-shielding box 106, and the first variable-angle guide rail 104 can be disposed on a side surface $S_3$ (for example, the first side surface $S_{31}$) of the airtight light-shielding box 106. The objective table 101, the first variable-angle guide rail 104 (on which the measurement instrument 103 is disposed), and the vertical guide rail 107 (on which the light source 102 is disposed) are jointly disposed inside the airtight light-shielding box 106, so that the color diffraction test device is easy to carry, and the airtight light-shielding box 106 provides a dark test environment, so that there is no need to test in a dark room, and it is convenient for operators to perform test operations.

Based on the same inventive concept, an embodiment of the present disclosure provides a color diffraction test system, including the above color diffraction test device according to embodiments of the present disclosure. Since the principle of the color diffraction test system for solving the problem is similar to the principle of the above color diffraction test device for solving the problem, implementations of the color diffraction test system can refer to the above embodiments of the color diffraction test device, and the repetition will be omitted.

At present, a photoelectric test method for a display device mainly measures parameters such as traditional brightness, chromaticity, and color fidelity under dark room conditions. Here, brightness test is carried out by the following method: the display device and a measurement instrument are placed opposite to each other; then, a driving signal is applied to the display device to make the full screen at the highest grayscale luminous level, and a 100% white signal is applied to make the full screen emit white light with the maximum brightness; finally, central brightness of the display device is tested with the measurement instrument. The chromaticity test method is as follows: the difference compared with the brightness test method is that 100% white, red, green, and blue signals are applied to measure CIE1931 chromaticity coordinates (x, y) of each primary color, and CIE1976 UCS chromaticity coordinates u', v' can also be used to represent. The test method for color fidelity is as follows: the difference compared with the brightness test method and the chromaticity test method is that 100% red, green, blue, yellow, cyan, magenta signals are applied to test three stimulus values $X_n$, $Y_n$, $Z_n$ of the white signal, as the white reference coordinate values, calculated as follows.

Test data of primary color and sub-primary color are converted into CIE LAB color coordinates by formulas (1), (2) and (3):

$$L^* = 116f(Y/Y_n) - 16 \quad (1)$$

$$a^* = 500[f(X/X_n) - f(Y/Y_n)] \quad (2)$$

$$b^* = 200[f(Y/Y_n) - f(Z/Z_n)] \quad (3)$$

in the formula:

$$f(t) = \begin{cases} t^{1/3} & t > \left(\frac{6}{29}\right)^3 \\ \frac{1}{3}\left(\frac{29}{6}\right)^2 t + \frac{16}{116} & \text{others} \end{cases}$$

a difference between two stimulus values is quantified using the following color difference equation, as shown in formulas (4):

$$\Delta E^*_{ab} = \sqrt{(\Delta L^*)^2 + (\Delta a^*)^2 + (\Delta b^*)^2} \quad (4)$$

in the formula, $\Delta L^*$, $\Delta a^*$, $\Delta b^*$ are differences between reference color data and test data $L^*$, $a^*$, $b^*$.

The above existing test methods refer to IEC international standards and national standards, IEC 62341-6-1, IEC 62341-6-3, and none of them can objectively characterize the color diffraction phenomenon.

Figure 4:
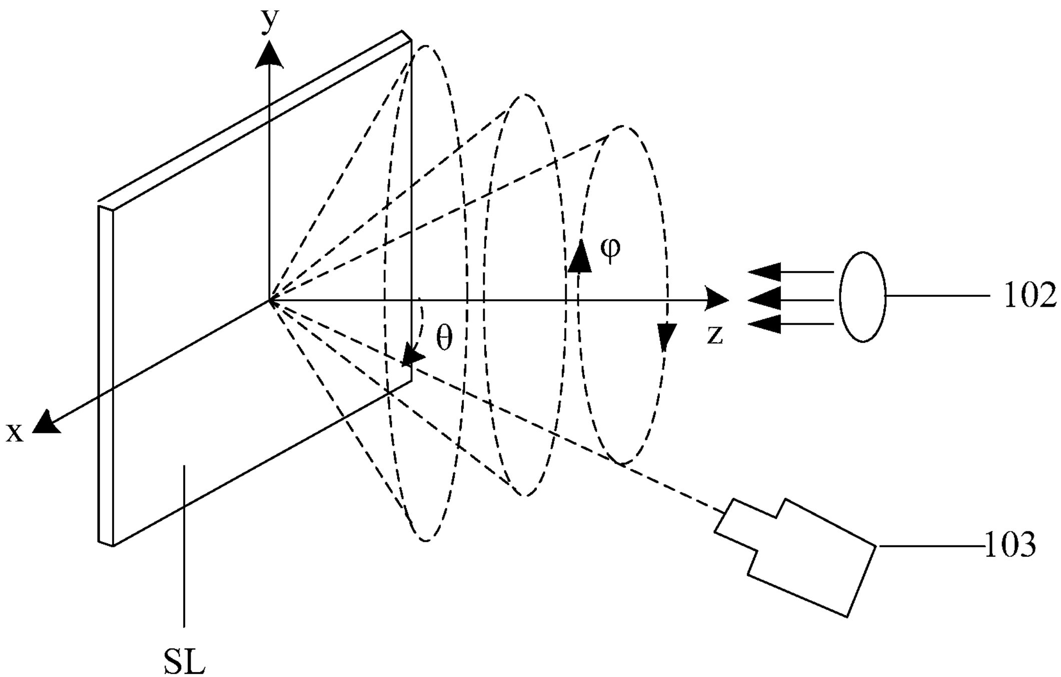
FIG. 4 is a schematic diagram of testing with the color diffraction test device shown in FIG. 1.
Figure 5:
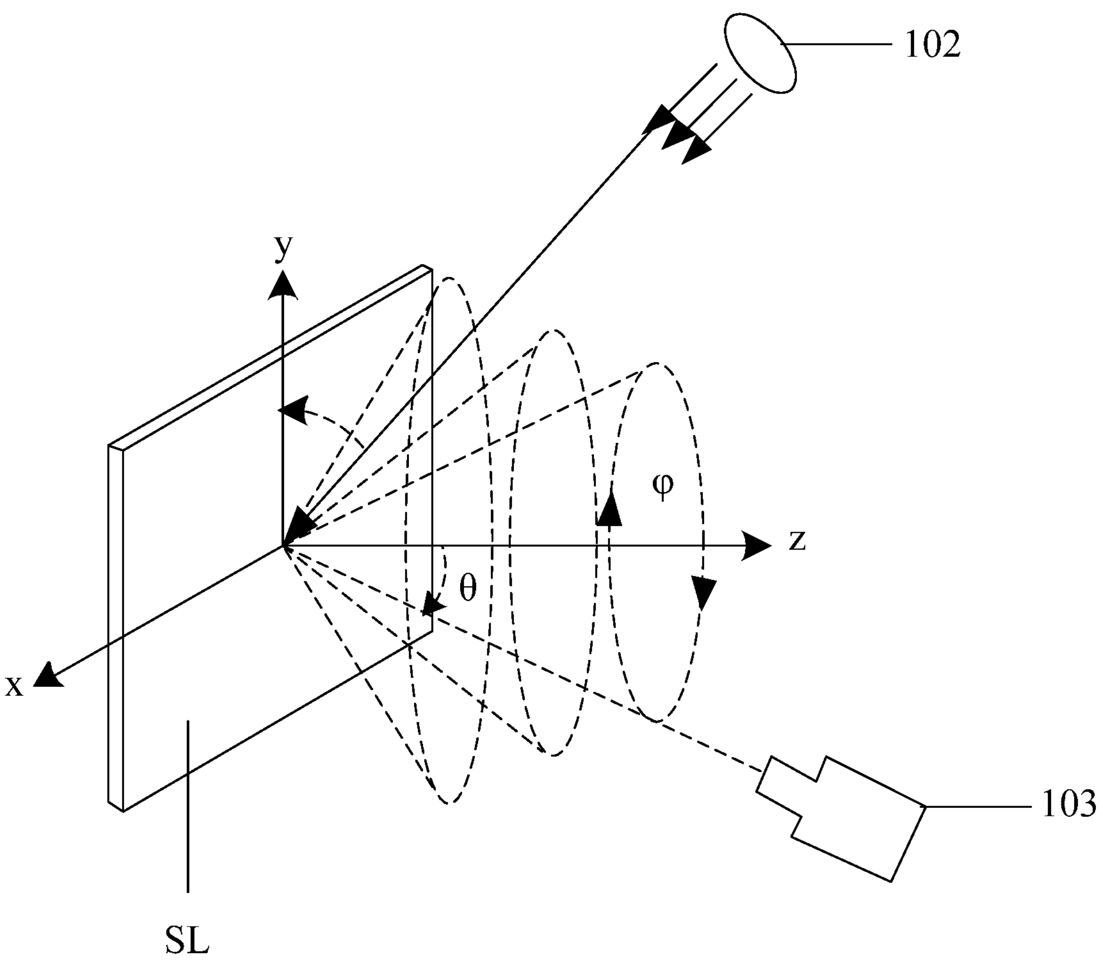
FIG. 5 is a schematic diagram of testing with the color diffraction testing device shown in FIG. 3.

In order to realize the objective characterization of the diffraction phenomenon, an embodiment of the present disclosure provides a test method for a color diffraction test device, as shown in FIG. 4 and FIG. 5, which may include following steps.

Step 1: using a light source to irradiate a to-be-tested sample on an objective table, and adjusting a relative position between a light spot center of the light source and a center of the objective table until the light spot center of the light source roughly coincides with the center of the objective table.

Step 2: setting up a measurement angle of a measurement instrument, and adjusting a relative position between the measurement center of the measurement instrument and the center of the objective table at the measurement angle set for a first time until the measurement center of the measurement instrument roughly coincides with the center of the objective table.

Step 3: at each measurement angle, the objective table rotates a single revolution (for example, rotates from the rotation angle φ=0° to φ=360°) around the perpendicular bisector of the objective table in the plane where the objective table is located, and during a rotation process, testing brightness L*, and color coordinates a* and b* of the test point (such as the center) of the to-be-tested sample by the measurement instrument once the objective table rotates a preset angle; the test point of the to-be-tested sample is on the perpendicular bisector of the objective table.

Step 4: using a following formula to characterize a strength of the color diffraction phenomenon at each measurement angle:

$$\Delta l_{ab}* = \sqrt{(\Delta a*)^2 + (\Delta b*)^2};$$

$$\Delta E_{ab} = \sqrt{(\Delta L*)^2 + (\Delta a*)^2 + (\Delta b*)^2};$$

here, the smaller $\Delta l_{ab}*$ is, the whiter a light color of the color diffraction phenomenon is, the smaller $\Delta E_{ab}*$ is, the weaker light brightness of the color diffraction phenomenon is, and Δa* is a difference between a* and a reference color coordinate 0, Δb* is a difference between b* and the reference color coordinate 0, and ΔL* is a difference between L* and reference brightness 0.

In the above test method according to embodiments of the present disclosure, based on the CIE LAB color coordinate system, an irradiance spectrum interpolation $\Delta E_{ab}*$ and a color channel interpolation $\Delta l_{ab}*$ are used, under the condition that the position of the light source and the position of the measurement instrument are fixed, and with the rotation angle φ of the objective table, the overall color diffraction phenomenon and degree of the display device are quantitatively and objectively characterized, to provide a reference basis for technology development and customer delivery.

Generally, under the CIE LAB color coordinate system, the origin of the color coordinates is (L*=0, a*=0, b*=0), the brightness L* equal to 0 represents black, and the brightness L* equal to 100 represents white. The color coordinate a* equal to a negative value represents green, and the color coordinate a* equal to a positive value represents red. The color coordinate b* equal to a negative value represents blue, and the color coordinate b* equal to a positive value represents yellow.

In some embodiments, in the above test method according to embodiments of the present disclosure, as shown in FIG. 4, the light source 102 irradiates the to-be-tested sample SL vertically (equivalent to be perpendicular to the plane xy where the objective table is located). The measurement instrument 103 is on one side of the perpendicular bisector (equivalent to the z-axis) of the objective table 101. At this time, during the process of the objective table 101 rotating around the z-axis in the plane xy, the light source 102 is always on the z-axis, and the measurement instrument 103 rotates in the plane xz relative to the objective table 101. Differences in color diffraction phenomena in different test directions may be large, so it is necessary to test the color diffraction phenomenon at intervals of small angles (for example, not greater than 2°). In other words, "during the rotation process, testing the brightness L* and the color coordinates a* and b* of the center of the to-be-tested sample by the measurement instrument once the objective table rotates the preset angle" in the above step 3 can be realized by: during the rotation process, testing the brightness L* and the color coordinates a* and b* of the center of the to-be-tested sample by the measurement instrument at every interval of a rotation angle.

In some embodiments, in the above test method according to embodiments of the present disclosure, as shown in FIG. 5, the light source 102 and the measurement instrument 103 are disposed symmetrically with respect to the perpendicular bisector (equivalent to the z-axis) of the objective table 101. At this time, during the process of the objective table 101 rotating around the z-axis in the plane xy, the light source 102 and the measurement instrument 103 rotate in the plane xz relative to the objective table 101. Differences in color diffraction phenomena in different test directions may be small, so the color diffraction phenomenon can be tested at intervals of larger angles (for example, not greater than 45°). In other words, "during the rotation process, testing the brightness L* and the color coordinates a* and b* of the center of the to-be-tested sample by the measurement instrument once the objective table rotates the preset angle" in the above step 3 can be realized by: during the rotation process, testing the brightness L* and the color coordinates a* and b* of the center of the to-be-tested sample by the measurement instrument at every interval of a rotation angle not greater than 45°. Of course, it is also possible to test once at an interval of 30°, 60°, etc., which is not limited here.

Obviously, although embodiments of the present disclosure have been described, those skilled in the art can make various changes and modifications to embodiments of the present disclosure without departing from the spirit and scope of embodiments of the present disclosure. In this way, if these modifications and variations of embodiments of the present disclosure fall within the scope of the claims of the present disclosure and their equivalent technologies, the present disclosure also intends to include these modifications and variations.

What is claimed is:

1. A color diffraction test device, comprising:

an objective table configured to drive a to-be-tested sample to rotate in a plane where the objective table is located during a test process, wherein a rotation axis of the objective table is a perpendicular bisector of the objective table, a test point of the to-be-tested sample is on the perpendicular bisector of the objective table;

a light source configured to irradiate the to-be-tested sample, wherein an orthographic projection of a light spot center of the light source on the objective table roughly coincides with a center of the objective table;

a measurement instrument, wherein the measurement instrument and the light source are located on a same side of the objective table, an orthographic projection of a measurement center of the measurement instrument on the objective table roughly coincides with the center of the objective table, and an orthographic projection of the measurement instrument on the objective table does not overlap with an orthographic projection of the light source on the objective table; the measurement instrument is configured to test a color diffraction phenomenon of the to-be-tested sample irradiated by the light source;

wherein the color diffraction test device further comprises: a vertical guide rail, wherein the vertical guide rail is on the perpendicular bisector of the objective table, and the light source is disposed on the vertical guide rail;

the light source moves on the vertical guide rail to change a distance from the light source to the to-be-tested sample;

wherein the color diffraction test device further comprises: an airtight light-shielding box, inner surfaces of the airtight light-shielding box comprise an upper surface and a lower surface opposite to each other; wherein, the objective table is disposed on the lower surface, the vertical guide rail is disposed on the upper surface.

2. The color diffraction test device according to claim 1, further comprising: a first variable-angle guide rail on which the measurement instrument is disposed;

wherein the measurement instrument moves on the first variable-angle guide rail to change a measurement angle of the measurement instrument, and the measurement angle is an angle between a connection line of a center of the measurement instrument and a center of the to-be-tested sample and the perpendicular bisector of the objective table, an orthographic projection of the center of the to-be-tested sample on the objective table roughly coincides with the center of the objective table.

3. The color diffraction test device according to claim 2, further comprising: a second variable-angle guide rail on which the light source is disposed;

wherein the light source moves on the second variable-angle guide rail to change an incident angle at which light of the light source irradiates the to-be-tested sample, and the incident angle is an angle between a connection line of a center of the light source and the center of the to-be-tested sample and the perpendicular bisector of the objective table.

4. The color diffraction test device according to claim 3, wherein the first variable-angle guide rail and the second variable-angle guide rail are disposed symmetrically with respect to the perpendicular bisector of the objective table.

5. The color diffraction test device according to claim 4, wherein a shape of the first variable-angle guide rail and a shape of the second variable-angle guide rail are both an arc, and an orthographic projection of a center of a circle where the arc is located on the objective table roughly coincides with the center of the objective table.

6. The color diffraction test device according to claim 5, wherein an angle between a tangent line of the arc and the perpendicular bisector of the objective table is in a range of 0° to 80°.

7. The color diffraction test device according to claim 3, wherein the inner surfaces of the airtight light-shielding box further comprise a first side surface and a second side surface opposite to each other and connecting the upper surface and the lower surface; wherein, the first variable-angle guide rail is disposed on the first side surface, and the second variable-angle guide rail is disposed on the second side surface.

8. The color diffraction test device according to claim 1, wherein the inner surfaces of the airtight light-shielding box further comprise a side surface connecting the upper surface and the lower surface; wherein, the first variable-angle guide rail is disposed on the side surface.

9. The color diffraction test device according to claim 3, wherein a ratio of a distance between the center of the light source and the center of the to-be-tested sample to an effective diameter of the light source is greater than or equal to any one of 5 to 10.

10. The color diffraction test device according to claim 9, wherein the distance between the center of the light source and the center of the to-be-tested sample is in a range of 10 cm to 100 cm.

11. The color diffraction test device according to claim 1, further comprising: a diaphragm, wherein the diaphragm is fixed on a light-emitting surface of the light source, and a diameter of the diaphragm is adjustable.

12. The color diffraction test device according to claim 11, wherein the diameter of the diaphragm is in a range of 1 mm to 5 mm.

13. The color diffraction test device according to claim 1, wherein the light source is a white light source.

14. The color diffraction test device according to claim 1, wherein a distance between the center of the measurement instrument and the center of the to-be-tested sample is in a range of 20 cm to 60 cm.

15. The color diffraction test device according to claim 1, wherein measurement field angles of the measurement instrument comprise 0.1°, 0.2° and 1°.

16. A color diffraction test system, comprising the color diffraction test device according to claim 1.

17. A test method for the color diffraction test device according to claim 1, comprising:

using the light source to irradiate the to-be-tested sample on the objective table, and adjusting a relative position between the light spot center of the light source and the center of the objective table until the light spot center of the light source roughly coincides with the center of the objective table;

setting up a measurement angle of the measurement instrument, and adjusting a relative position between the measurement center of the measurement instrument and the center of the objective table at the measurement angle set for a first time until the measurement center of the measurement instrument roughly coincides with the center of the objective table;

wherein at each measurement angle, the objective table rotates a single revolution around the perpendicular bisector of the objective table in the plane where the objective table is located, and during a rotation process, testing brightness L* and color coordinates a* and b* of the test point of the to-be-tested sample by the measurement instrument once the objective table rotates a preset angle; the test point of the to-be-tested sample is on the perpendicular bisector of the objective table;

using a following formula to characterize a strength of the color diffraction phenomenon at each measurement angle:

$$\Delta l_{ab}*=\sqrt{(\Delta a*)^2+(\Delta b*)^2};$$

$$\Delta E_{ab}*=\sqrt{(\Delta L*)^2+(\Delta a*)^2+(\Delta b*)^2};$$

wherein the smaller $\Delta l_{ab}$* is, the whiter a light color of the color diffraction phenomenon is, the smaller $\Delta E_{ab}$* is, the weaker light brightness of the color diffraction phenomenon is, and Δa* is a difference between a* and a reference color coordinate 0, Δb* is a difference between b* and the reference color coordinate 0, and ΔL* is a difference between the L* and reference brightness 0.

18. The test method according to claim 17, wherein the light source irradiates the to-be-tested sample vertically, and the measurement instrument is on one side of the perpendicular bisector of the objective table;

during the rotation process, testing the brightness L* and the color coordinates a* and b* of the test point of the to-be-tested sample by the measurement instrument once the objective table rotates the preset angle, comprises:

during the rotation process, testing the brightness L* and the color coordinates a* and b* of the center of the to-be-tested sample by the measurement instrument at every interval of a rotation angle not greater than 2°.

19. The test method according to claim 17, wherein the light source and the measurement instrument are disposed symmetrically with respect to the perpendicular bisector of the objective table;

during the rotation process, testing the brightness L* and the color coordinates a* and b* of the test point of the to-be-tested sample by the measurement instrument once the objective table rotates the preset angle, comprises:

during the rotation process, testing the brightness L* and the color coordinates a* and b* of the center of the to-be-tested sample by the measurement instrument at every interval of a rotation angle not greater than 45°.

* * * * *